May 6, 1941.    H. KUPPENBENDER ET AL    2,241,017
PHOTOGRAPHIC CAMERA
Filed Sept. 29, 1939
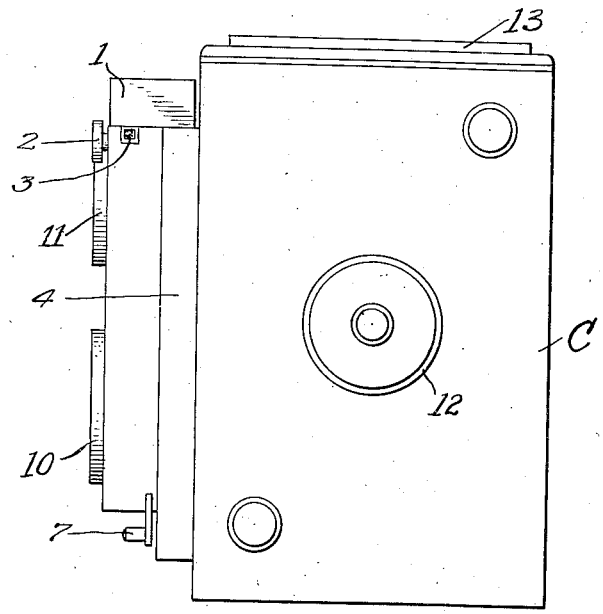
Fig.1
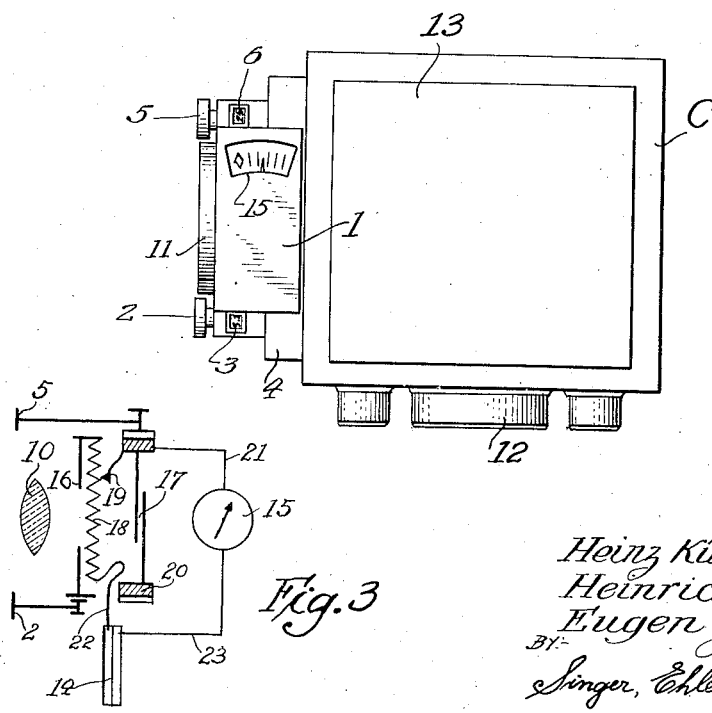
Fig.2
Fig.3
Inventors
Heinz Küppenbender
Heinrich Eyth
Eugen Jörg
BY
Singer, Ehlert, Stern & Carlberg
Attys.

Patented May 6, 1941

2,241,017

UNITED STATES PATENT OFFICE 2,241,017

PHOTOGRAPHIC CAMERA

Heinz Kuppenbender, Dresden, Heinrich Eyth, Stuttgart-Sonnenberg, and Eugen Jörg, Stuttgart, Germany, assignors to Zeiss Ikon Aktiengesellschaft, Dresden, Germany Application September 29, 1939, Serial No. 297,186 In Germany October 18, 1938

4 Claims. (Cl. 95—10)

This invention relates to improvements in photographic cameras.

It is particularly directed to improvements in cameras equipped with a photoelectric exposure meter, and it is an object of the present invention to simplify the mounting of the photoelectric exposure meter and the positioning of the conductor elements which form parts of the electric circuit of the exposure meter.

It is also an object of the invention to provide a photographic camera with an extension in which the lens for the photographic camera is mounted and to position the photoelectric exposure meter on this extension on which also the means for controlling the exposure are located.

It may, therefore, be described as one of the objects of the invention to provide a photographic camera with an extension in which the lens of the camera is positioned and in which not only the means for adjusting the shutter of the lens and the setting of the diaphragm are disposed, but on which also the photoelectric exposure meter is located, whereby the latter is moved together with the extension without necessitating the interposition of flexible conductors between the exposure control elements and the exposure meter.

In cameras in which a finder lens is associated with the main lens or objective of the camera to permit the focusing of the main lens by observation of the picture furnished through the finder lens, and adjustment of the camera extension until a sharp picture appears in the finder, it is also an object of the invention to mount the photoelectric exposure meter on that extension of the camera with which the two lenses and the exposure control elements are united.

With these and numerous other objects in view, an embodiment of the invention is illustrated in the accompanying drawing, to which reference is made in the following specification.

In the drawing:

Fig. 1 is a side elevation of a photographic camera showing the invention;

Fig. 2 is a top plan view of the same, and

Fig. 3 is a diagrammatic view of the exposure meter and lens control elements in the camera.

The camera illustrated by way of example pertains to that type of cameras in which a main lens or objective 10 is associated with a finder lens 11 in rigid relation to each other and in which the focusing may be obtained by shifting an extension 4 of the camera casing C in axial direction outwardly or inwardly. This displacement of the extension 4 in axial direction may, for instance, be effected by the rotary knob 12 at the side of the camera housing C by means of instrumentalities which are of no importance for the present invention. The hood 13 at the top of the casing C may be raised to permit the user to inspect the picture projected through the finder lens upon a frosted plate or the like. It is obvious, however, that any other means for observing the picture produced through the finder lens 11 may be selected. When the picture projected by the finder lens shows the desired sharpness, the extension 4 has reached that position in which the exposure is to be made.

A photoelectric exposure meter 1 is mounted on the extension 4 in such manner as to be movable with respect to the camera casing C whenever the camera extension 4 is being adjusted. As illustrated in Fig. 3 diagrammatically, the photoelectric exposure meter comprises a photosensitive cell 14 and an indicator instrument 15, these two elements being enclosed within a housing on top of the adjustable extension 4 to permit the indications of the instrument 15 to be read while the camera is held in operative position at about waist level of the user.

The exposure control elements through the adjustment of which also the reading of the indicator 15 of the photoelectric exposure meter may be influenced, may be formed by a diaphragm 16 and a shutter diagrammatically indicated at 17. The means for setting the diaphragm to a predetermined opening or to an opening determined by the indications of the photoelectric exposure meter are indicated in Fig. 1 at 2, and are shown in the form of a rotary knob near the top and on the front wall of the movable support 4 for the lenses 10 and 11. Upon rotation of the knob 2, the opening or stop of the diaphragm 16 will be adjusted in a known way by means which are of no importance for the present invention.

Similarly also the shutter diagrammatically indicated at 17 may be adjusted from the front of the movable support 4 by a rotary knob 5, and the setting of the shutter to a predetermined exposure time also is effected through instrumentalities which are not shown in the drawing. Many different means are known in the art for setting of the shutter and varying the diaphragm stops by manipulation of control elements on the camera.

The operative connection between the exposure control means 16 and 17 with the exposure meter is effected in the embodiment illustrated by combining a resistance of annular form, as indicated at 18 with the diaphragm 16, whereby upon adjustment of the diaphragm 16 through rotation of the knob 2, said annular resistance 18 also is rotated. The operative connection between the shutter 17 and the photoelectric exposure meter comprises a contact element 19 in frictional engagement with the annular resistance 18 and mounted on a rotary carrier 20 which is actuated upon rotation of the knob 5 whenever it is desired to vary the speed to which the shutter has been set. The annular resistance 18 as well as the contact 19 is within the circuit of the photoelectric exposure meter by means of the conductors 21 and 22 respectively, while the conductor 23 connects the instrument 16 with the cell 14 of the exposure meter.

The reading of the instrument may take place from above when the camera is held at waist level while the operator observes the picture projected by the finder lens 11 through the hood 13 in the ordinary way. The extension 4, however, also is provided with openings 3 and 6 through which indications relating to the adjustment of the diaphragm and shutter respectively appear, and hence, the operation of the camera is greatly facilitated. The user having for instance selected a certain diaphragm as required by the depth of the focus desired, observes the reading of the instrument 15 and then adjusts the shutter speed until the pointer of the instrument registers with a desired mark on the dial of the instrument. The observation of the instrument as well as the setting of the diaphragm is greatly facilitated through the provision of the observation windows on top of the extension 4. Similarly, if the operator desires to select a certain shutter speed, he adjusts the manipulating knob 5 until the indication on the window 6 shows that the shutter has been set to the desired speed, and then, while exposing the cell of the photoelectric exposure meter to the light reflected from the object to be photographed, adjusts the diaphragm knob 2 until the pointer of the exposure meter arrives at the desired mark.

It will also be seen that in spite of the lens 10 being mounted on an extension which is movable with respect to the casing C, the conductors for completing the circuit through the exposure meter are not subjected to a great alteration in their position, so that any danger of breaking connections or breaking the conductors by frequent alterations of their position or length is obviated. If the exposure control elements as shutter or diaphragm and their setting means were located on the movable extension with the exposure meter secured to the casing of the camera, the compact arrangement of the present invention could not be maintained.

We claim:

1. In combination with a twin-lens camera, in which one lens serves as a finder lens and the other one as a photographic objective, a camera casing provided with a manually adjustable extension on which said two lenses are mounted with their axes parallel to each other, an adjustable diaphragm and a shutter associated with said photographic objective, a diaphragm adjusting member and a shutter speed adjusting member, both mounted on said adjustable extension, of a photoelectric exposure meter including in a circuit a photoelectric cell, a variable resistance and a measuring instrument, all of which are mounted on said adjustable extension, means operatively connecting said diaphragm adjusting member with said variable resistance, and a second means operatively connecting said shutter speed adjusting member with said variable resistance, whereby upon adjustment of either one of said adjusting members said resistance is varied and therewith the indication of said measuring instrument.

2. In combination with a twin-lens camera, in which one lens serves as a finder lens and the other one as a photographic objective, a camera casing provided with a manually adjustable extension on which said two lenses are mounted with their axes parallel to each other, an adjustable diaphragm and a shutter associated with said photographic objective, a diaphragm adjusting member and a shutter speed adjusting member, both mounted on said adjustable extension, of a photoelectric exposure meter including in a circuit a photoelectric cell, a variable resistance and a measuring instrument, all of which are mounted on said adjustable extension, said resistance including an annular resistor element which is fixedly attached to a rotatable element of said diaphragm to be rotatably adjusted whenever said diaphragm adjusting member is operated, said resistance also including a contact member in sliding engagement with said resistor element, said contact member being fixedly attached to a rotatable carrier which is operatively connected with said shutter speed adjusting member so as to adjust said slidable contact member along said resistor element whenever the shutter speed adjusting member is operated.

3. In combination with a twin-lens camera, in which one lens serves as a finder lens and the other one as a photographic objective, a camera casing provided with a manually adjustable extension on which said two lenses are mounted with their axes parallel to each other, an adjustable diaphragm and a shutter associated with said photographic objective, a diaphragm adjusting member and a shutter speed adjusting member, both mounted on said adjustable extension, of a photoelectric exposure meter including in a circuit a photoelectric cell, a variable resistance and a measuring instrument, all of which are mounted on said adjustable extension, said resistance including an annular resistor element which is fixedly attached to a rotatable element of said diaphragm to be rotatably adjusted about the optical axis of the photographic objective whenever said diaphragm adjusting member is operated, said resistance also including a contact member in sliding engagement with said resistor element, said contact member being fixedly attached to a rotatable annular carrier arranged concentrically about said optical axis, said carrier being operatively connected with said shutter speed adjusting member so as to adjust said slidable contact member along said resistor element whenever the shutter speed adjusting member is operated.

4. In combination with a twin-lens camera, in which one lens serves as a finder lens and the other one as a photographic objective, a camera casing provided with a manually adjustable extension on which said two lenses are mounted with their axes parallel to each other, an adjustable diaphragm and a shutter associated with said photographic objective, a diaphragm adjusting member and a shutter speed adjusting member, both mounted on said adjustable extension, of a photoelectric exposure meter including in a circuit a photoelectric cell, a variable resistance and a measuring instrument, all of which are mounted on said adjustable extension, said resistance including an annular resistor element and a contact member in slidable engagement therewith and mounted on a rotatable carrier element, said resistor element and rotatable carrier element being rotatable about the optical axis of said photographic objective, one of said rotatable elements being operatively connected with said diaphragm adjusting member and the other rotatable element being operatively connected with said shutter speed adjusting member so as to vary said resistance whenever either one of said two adjusting members is operated.

HEINZ KUPPENBENDER.
HEINRICH EYTH.
EUGEN JÔRG.